United States Patent [19]

Fujiwara et al.

[11] Patent Number: 4,554,498

[45] Date of Patent: Nov. 19, 1985

[54] CONTROL APPARATUS FOR RUNNING MOVING OBJECT

[75] Inventors: Kunio Fujiwara; Hisashi Katoo; Fumihide Satoo; Hirokazu Taki, all of Amagasaki, Japan

[73] Assignee: Mitsubishi Denki Kabushiki Kaisha, Tokyo, Japan

[21] Appl. No.: 438,850

[22] PCT Filed: Mar. 16, 1982

[86] PCT No.: PCT/JP82/00073
§ 371 Date: Oct. 20, 1982
§ 102(e) Date: Oct. 20, 1982

[87] PCT Pub. No.: WO82/03283
PCT Pub. Date: Sep. 30, 1982

[30] Foreign Application Priority Data

Mar. 16, 1981 [JP] Japan .................................. 56-38316
Jun. 11, 1981 [JP] Japan .................................. 56-91396

[51] Int. Cl.[4] .......................... G05B 1/06; B64C 13/18
[52] U.S. Cl. .................................... 318/640; 318/587; 318/480; 318/396
[58] Field of Search ............... 318/480, 587, 272, 640, 318/612, 613, 614, 626, 467, 580; 343/7.4, 7 VM, 7 VC

[56] References Cited

U.S. PATENT DOCUMENTS

| 3,093,778 | 6/1963 | Tidwell | 318/480 X |
| 3,187,701 | 6/1965 | Heidt | 318/480 X |
| 3,612,206 | 10/1971 | Ohntrup | 318/587 X |
| 3,708,668 | 1/1973 | Tilley | 318/587 X |
| 3,743,056 | 7/1973 | Zitelli | 318/480 X |
| 3,886,555 | 5/1975 | Royal | 343/7.4 X |
| 3,934,250 | 1/1976 | Martin | 343/7.4 X |
| 4,039,782 | 8/1977 | Burckhardt | 343/7 VM X |
| 4,069,888 | 1/1978 | Wolters | 318/587 X |
| 4,215,759 | 8/1980 | Diaz | 318/587 X |
| 4,219,092 | 8/1980 | Richter | 318/587 X |
| 4,344,498 | 8/1982 | Lindfors | 318/587 X |

FOREIGN PATENT DOCUMENTS 3113086 1/1983 Fed. Rep. of Germany ...... 318/587

Primary Examiner—William M. Shoop, Jr.
Assistant Examiner—Patrick C. Keane
Attorney, Agent, or Firm—Lowe King Price & Becker

[57] ABSTRACT

The present invention relates to an apparatus for controlling a moving object and particularly for automatically stopping the moving object in a predetermined position and direction. The apparatus comprises a pair of photoelectric sensors having a light emitting element and a light receiving element for the moving object, and a pair of reflectors at predetermined positions opposing the photoelectric sensors. The moving object is stopped when the received light outputs of the photoelectric sensors are balanced with each other preferably in a vehicle in an automated factory.

13 Claims, 14 Drawing Figures

4,554,498

CONTROL APPARATUS FOR RUNNING MOVING OBJECT

TECHNICAL FIELD

The present invention relates to a running control apparatus for a vehicle, and particularly to such an apparatus adapted to automatically stop the vehicle in a predetermined position and direction.

BACKGROUND ART

Referring to FIGS. 12 and 13, an automatic running vehicle (1) of the prior art is shown which is loaded with a load (22) and is in a state of approaching in the direction of the arrow to a transporting/loading apparatus (5), such as a conveyor apparatus. In these figures, (24) denotes a guiding path, which is provided on a floor in order to define a running path of the automatic running vehicle (1). (25) denotes a mark sensor, which senses a deceleration point mark (26) and a stop point mark (27) which are provided near the guiding path (24). Meanwhile the broken lines in FIGS. 12 and 13 represent stop positions of vehicle (1).

Next, operation of the vehicle will be explained. In order to transport and transfer the load (22) with respect to the transporting/loading apparatus (5), the automatic running vehicle (1) approaches the transporting/loading apparatus (5) at a predetermined speed by means of electromagnetic or optical means, not shown, as the vehicle follows the guiding path (24) provided on the floor . During the approach the mark sensor (25) attached to the bottom face of the automatic running vehicle (1) begins the operation of sensing the electromagnetic or optical mark provided on the floor near the objective point.

When the mark sensor (5) senses the deceleration point mark (26), the running speed of the automatic running vehicle (1) is reduced to a low running speed at which the vehicle can immediately stop by a drive controlling apparatus (not shown) provided therein. In the process of continuing to run the automatic running vehicle (1) at the low speed, when the mark sensor (25) senses the stop point mark (27), the drive controlling apparatus immediately brakes the automatic running vehicle (1) to stop the same. By the above described sequence of operations, the distance interval between the automatic running vehicle (1) and the transporting-/loading apparatus (5) becomes approximately a predetermined value, and thus it is possible to transfer the load (22) between the automatic running vehicle (1) and the transporting/loading apparatus (5).

Since the conventional vehicle control apparatus for use in an automatic running vehicle is structured as described above, there are shortcomings in the prior art in that a guiding path must be provided and a particular mark (such as a magnetic piece or a metal piece) must be buried in a floor where the vehicle runs, and therefore it is necessary to undergo construction for removal or provision of the guiding path and the mark on the occasion of the change of the place where a transporting-/loading apparatus or the like is located, and in addition, for the same transporting/loading apparatus, it is difficult to change the approaching distance interval in accordance with the shape or volume of the load transported thereby.

DISCLOSURE OF THE INVENTION

A positioning stopping apparatus for a running moving object in accordance with the present invention includes a pair of photoelectric sensors each comprising a light emitting element and a light receiving element. A pair of reflectors opposed to the above described photoelectric sensor, are at a predetermined location. The running moving object is stopped when outputs of the received light by the above described photoelectric sensors are balanced with each other. According to the present invention, even if the location of the operation in a factory is frequently changed, it is possible to manage the change of the location easily without the necessity of particular additional construction.

BEST MODE FOR CARRYING OUT THE INVENTION

Figure 1:
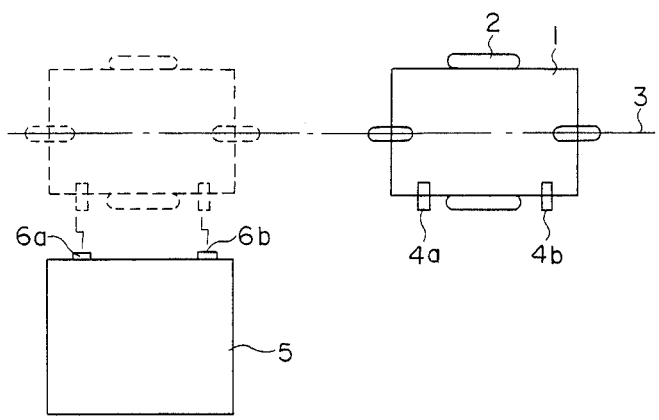
FIG. 1 is a schematic plan view showing one embodiment of a running control apparatus for a running moving object in accordance with the present invention.

FIG. 1 is a schematic plan view showing one embodiment of the present invention, and, in the figure, (1) denotes a running moving object which is driven by drive wheels shown as (2). (3) denotes a reference path along which the running moving object (1) runs, (4a), (4b), each denote a reflection type photoelectric sensor attached to one side surface of the running moving object (1), and (5) denotes a transporting/loading apparatus located near the working position or the like in a factory for delivering and receiving a load between the running moving object (1) and the apparatus 5, in which reflectors (6a), (6b) are attached to the side of apparatus 5 opposing the photoelectric sensors (4a), (4b) of the running moving object (1), respectively.

Figure 2:
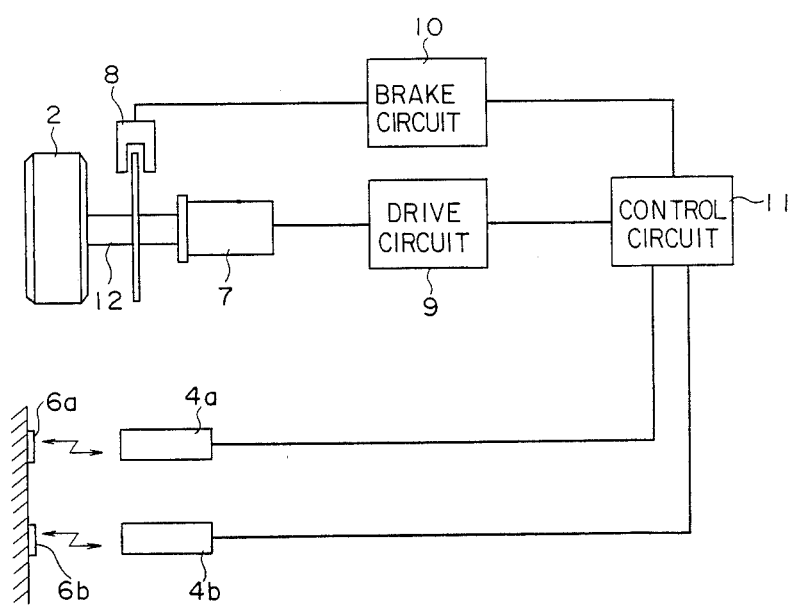
FIG. 2 is a block diagram of a control circuit in the interior of the running moving object.

FIG. 2 is a block diagram showing the general arrangement of a control system in the interior of the running moving object (1), and, in the figure, (7) denotes a drive motor coupled to the drive wheels (2) through an axle (12), which is driven through a drive circuit (9) responsive to a signal from a control circuit (11). (8) denotes a disk brake apparatus attached to the axle (12), which stops the drive wheels (2) through a brake circuit (10) responsive to a stopping signal from the control circuit (11).

The photoelectric sensors (4a), (4b) attached to the running moving object (1) are each a reflection type, and each is adapted to have a light emitting element and a light receiving element together in the sensor, to emit light from the light emitting element of the sensor itself, and to output a signal toward the control circuit (11) when the light receiving element detects the reflected light. It is possible to adjust the sensitivity in the reception of light not to detect reflected light other than that reflected from the reflector (6a), (6b), such as the reflected light from the side face of the transporting/loading apparatus (5).

Figure 3:
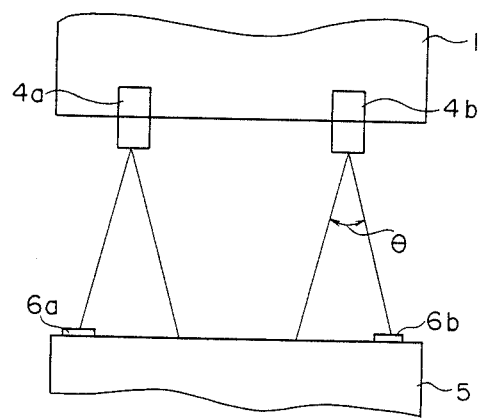
FIG. 3 is a plan illustrative view showing the relationship between photoelectric sensors and reflectors.

The photoelectric sensor, naturally, has the angle of directivity ($\theta$) being approximately 10 degrees. Therefore, as shown in FIG. 3, the reflectors (6a), (6b) are each attached to the transporting/loading apparatus (5) at the position of the outer edge of the angle of directivity in consideration of this angle of directivity.

In FIG. 1, the running moving object (1) which has been coming along the reference path (3) first detects the reflector (6b) by the photoelectric sensor (4a) when the object approaches the transporting/loading apparatus (5). However the object continues to run. Thereafter the running moving object (1) is stopped by stopping the drive motor (7) responsive to the stopping signal from the control circuit (11) and by energizing the disk brake apparatus (8) when the running moving object (1) arrives at a position shown by the dotted line in FIG. 1. Thus, the moving object is stopped when the photoeleclectric sensor (4b) detects the reflector (6b) a condilectric sensor (4b) detects the reflector (6b), , a condition hereinafter referred to as a balanced condition for the photoelectric sensors.

Since, as described above, the running moving object (1) is stopped under a balanced condition of the sensors, i.e., when the two photoelectric sensors simultaneously detect the two reflectors, respectively, it is possible to remove the influence of a displacement of positions by the angle of directivity ($\theta$), and to position and stop the running moving object (1) in the same manner as before irrespective of whether the running moving object (1) approaches the transporting/loading apparatus (5) from the right side or from the left side with respect to the transporting/loading apparatus (5).

Figure 4:
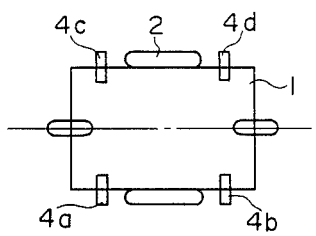
FIG. 4 is an illustrative view of the running moving object showing another embodiment of the present invention.

FIG. 4 shows another embodiment of the present invention, which further comprises photoelectric sensors (4c), (4d) similar to the photoelectric sensors (4a), (4b), provided at another side of the running moving object (1). According to the above described construction, it is possible to position and stop the running moving object (1) in case that the stop point resides at either side of the reference path (3), or in case that the running moving object (1) turns to approach the stop point, such as the transporting/loading apparatus (5) along the reference path in the reverse direction.

Figure 5:
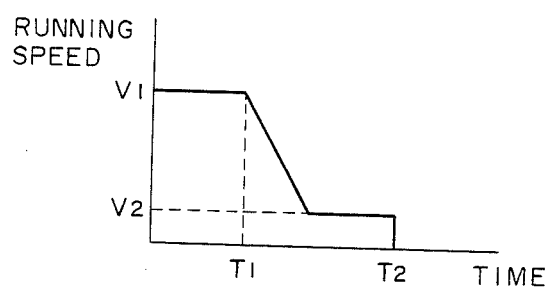
FIG. 5 is a time chart of running/stopping, explaining a further embodiment of the present invention.

Meanwhile, the present invention aims at positioning and stopping the running moving object (1) at a predetermined stop point with high accuracy, wherein when the running speed of the running moving object (1) is high, there is overcome a problem of an overrun by inertia after the stopping signal is transmitted until the running moving object (1) stops. In that case, for example as shown in FIG. 5, it is possible to position and stop the running moving object (1) with high accuracy by moving the running moving object (1) at a low speed ($V_2$) after the running speed is shifted to a deceleration mode at a time point ($T_2$) when the photoelectric sensor (4a) of the running moving object (1) detects the reflector (6b), and by stopping the running moving object (1) at a time point ($T_2$) when the photoelectric sensors are in a balanced condition, i.e., when sensor (4a) detects the reflector (6a) and the photoelectric sensor (4b) detects the reflector (6b), simultaneously.

FIGS. 6 to 11 are views showing further embodiments which may be combined with one another.

Figure 6A:
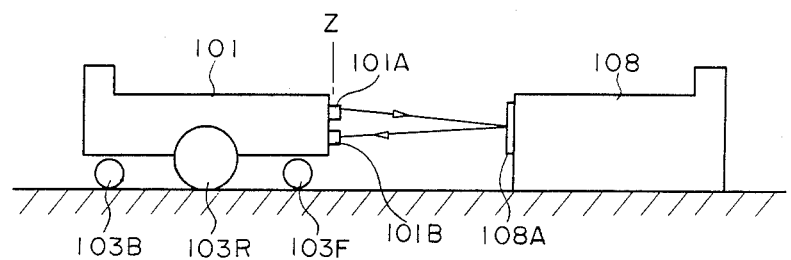
FIGS. 6(A) and (B) are schematic side elevation and plane views of another embodiment of the present invention, respectively.
Figure 6B:
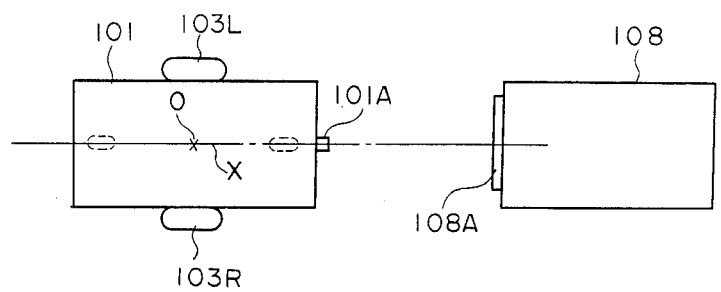
Figure 7:
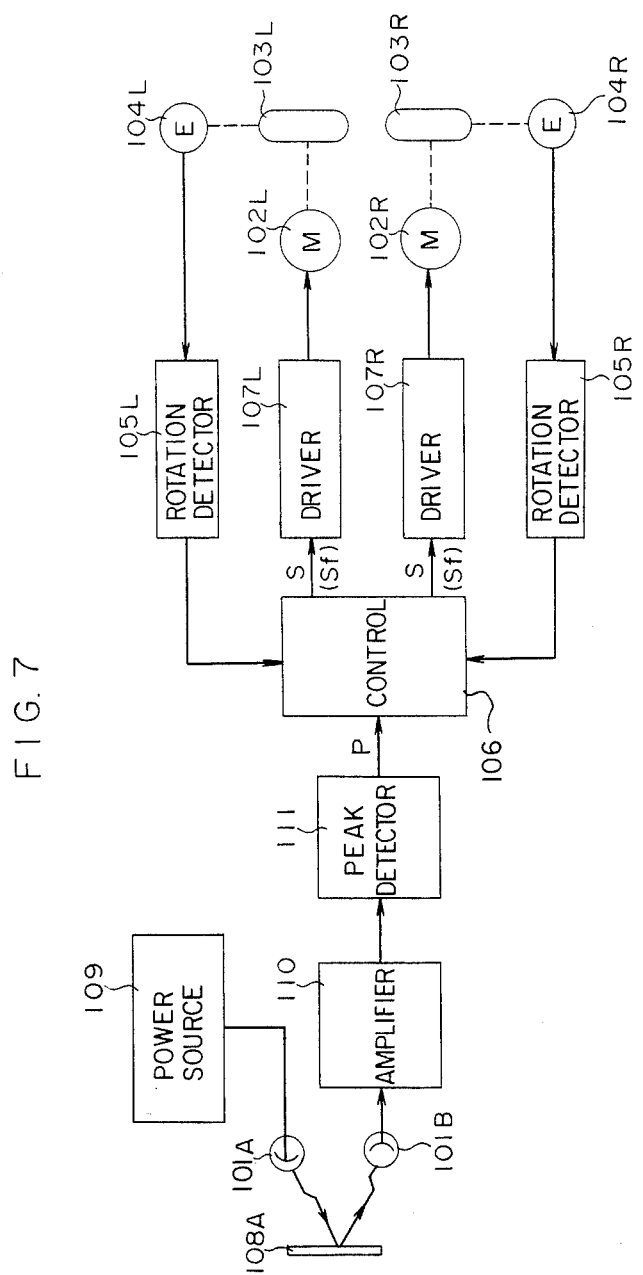
FIG. 7 is a block diagram showing the control portion in FIG. 6.

In FIGS. 6 and 7, (101) denotes an automatic running vehicle (the running moving object) in an automatic running vehicle system having no guiding rail, which comprises a left drive wheel (103L) and a right drive wheel (103R), at the center portions in the back and front directions of the vehicle body, individually driven by motors (102L), (102R), respectively. Encoders (104L) and (104R) are coupled to respective axles of both of the drive wheels (103L), (103R), respectively. Output pulses from the encoders (104L), (104R) are inputted to a rotation detecting portion (105L) of the left drive wheel and a rotation detecting portion (105R) of the right drive wheel, respectively, and outputs from the rotation detecting portions (105L), (105R) are supplied to an operation control portion (106). The automatic running vehicle (101) is a type of an automatic running vehicle having no guiding path, which runs while comparing and calculating data of the substantial run distance obtained from the rotation detecting portions (105L), (105R) with data of the predetermined distance to an objective position provided from a central control room or the like. The comparison and calculation is performed in an operation control portion, the result of the calculation being applied to the motors (102L), (102R) through a drive portion (107L) of the left drive wheel and a drive portion (107R) of the right drive wheel, respectively. In this embodiment, explanation of the control of running of the automatic running vehicle (101) is omitted. (108) denotes a target object such as the transporting/loading apparatus disposed inside of a yard of the automatic running system. (101A), (101B) denote a light emitting element and a light receiving element, respectively, which are attached to the vertical front face of the automatic running vehicle (101) with the centers of the elements being located on the vertical axis Z transversing the central axis X of the running vehicle. The amount of the received light of the light receiving element (101B) is maximum when the central axis X of the running vehicle is perpendicular to the reflecting face of a light reflector (108A). The light reflector (108A) is attached to one of the vertical face portions of the target object, such as the transporting/loading apparatus (108).

Figure 10:
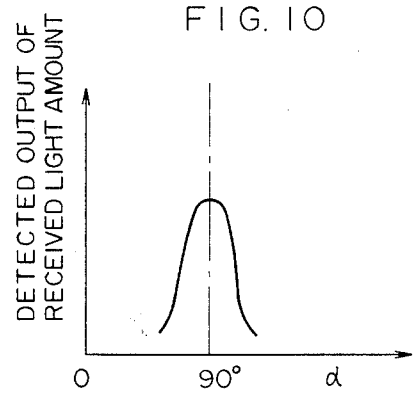
FIG. 10 is an output characteristic diagram of a sensing amplifying portion in the above described embodiment.

The light emitting element (101A) emits modulated light upon reception of a constant level output modulated in a particular frequency from a power source portion (109) for a light emitting element. The output from the light receiving element (101B) is inputted to a sensing amplifying portion (110). The sensing amplifying portion (110) receives an electric signal having a level proportional to the amount of incident light, to demodulate the same in said particular frequency. Accordingly, the amplifier outputs an electric signal having a proportional level to the amount of light reflected from the light reflector (100A) out of light transmitted from the light emitting element (101A) to the light reflector (108A). The characteristic of this output is shown in FIG. 10. The angle represents an angle of the central axis X with respect to the light reflector (108A). (111) denotes a peak detecting portion, which detects, when the output from the sensing amplifying portion (110) reaches the maximum value, the output to supply a peak detecting signal for the operation control portion (106). The operation control portion (106) comprises, in addition to the above described running control function, a function for outputting a fixed-point-turn scanning command S when the automatic running vehicle (101) terminates to turn up to an original guiding position which will be later described, to operate to turn the automatic running vehicle (101) at a fixed point. The fixed-point-turn scanning commands S are commands for rotating the drive wheels (103L), (103R) reversely to each other, which have as contents predetermined directions for rotating the drive wheels (103L), (103R) responsive to the above described original guiding position, and are individually supplied to the motor (102L), (102R) through the motor driving portion (107L), (107R). When the fixed-point-turn scanning commands S are outputted, the automatic running vehicle (101) turns at a fixed point with the center of the turning O being the medium point between the drive wheels (103L), (103R). The fixed-point-turn scanning commands S disappear when the operation control portion (106) receives the peak detecting signal P. Simultaneously, the operation control portion (106) supplies a clear signal to the rotated amount detecting portions (105L), (105R), thereafter detects the existence of the angle of an excessive turn from the difference of the rotated amounts of the drive wheels (103L), (103R) inputted thereto from the rotated amount detecting portions (105L), (105R) and, on the occasion of the presence of the excessive turn, outputs an excessive turn correcting command $S_f$. The excessive turn correcting command $S_f$ has as its content the amount and direction for rotating the drive wheels (103L), (103R) in order to turn the automatic running vehicle (101) at the fixed point by the angle of the excessive turn, and is applied to the motors (102L), (102R) through the motor driving portions (107L), (107R). Meanwhile, the rotating directions of the drive wheels (103L), (103R) on this occasion are reverse to the rotating directions thereof on the occasion of the fixed-point-turn scanning commands.

Figure 8:
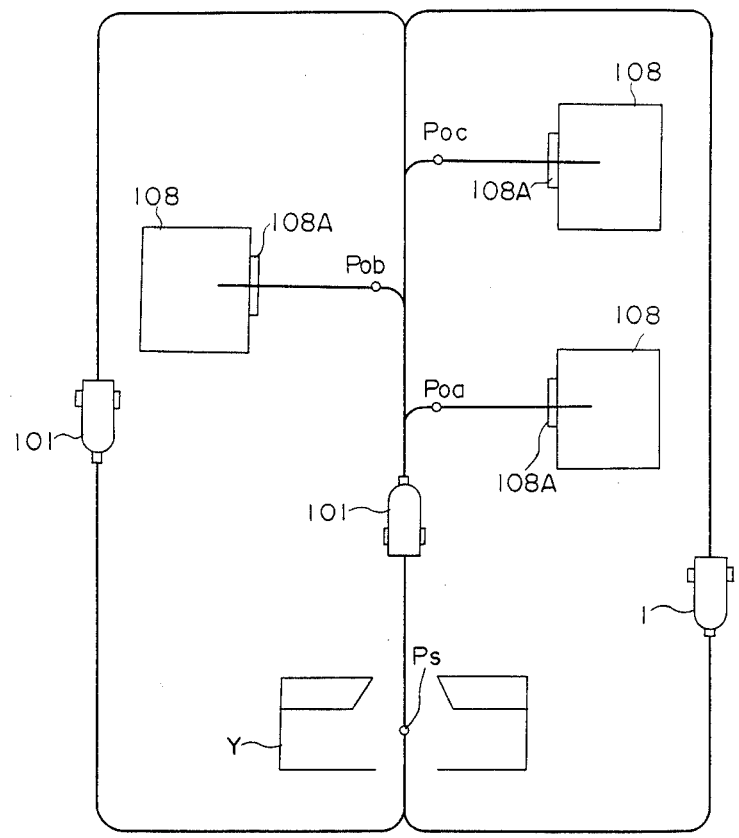
FIGS. 8 and 9 are operation illustrative views of the above described embodiment.

Next, the operation of this embodiment is explained in conjunction with an automatic running vehicle system adapted to the target object (108) producing system shown in FIG. 8.

Figure 9:
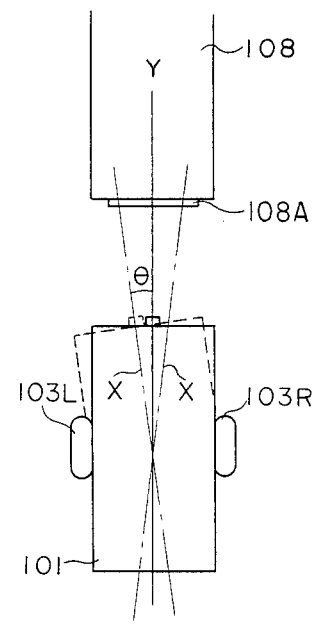

The automatic running vehicle (101) is loaded with a load to be transported in a central control room and an automated storehouse Y, and next receives a command for designating the target object (108) which is the destination of the same to run up to the original guiding position Po (Poa, Pob, Poc) corresponding to the target object 108, the destination of the vehicle. The portion between each of the original guiding positions and a starting position Ps of the automatic running vehicle (101), except for the portion necessary to turn the automatic running vehicle (101), is linear and the automatic running vehicle (101) is positioned at the target position by comparing and calculating the number of the outputted pulses from the encoders (104L), (104R) provided in the drive wheels (103L), (103R) with the predetermined distance up to the original guiding position Poa. If the automatic running vehicle (101) deviates slightly arcuately from the above described linear portion, the deviation is detected by a gyro-compass, not shown, and is automatically corrected by transmitting data of the angle to be corrected from the operation control portion (106) to the motors (102L), (102R). The turning to the original guiding positions is performed by predetermining the turning angles (in the drawing, 90°), by comparing and calculating the predetermined angles with the value responsive to the output from the above described gyro-compass. It is assumed that the attitude of the automatic running vehicle (101) after termination of the above described turn is taken with the axis X deflecting with respect to the central axis of the light reflector Y by the angle $\theta$, as shown in FIG. 9. When the automatic running vehicle (101) stops, the fixed-point-turn scanning command S is outputted from the operation control portion (106). Since the direction of deflection with respect to the central axis X of the automatic running vehicle (101) is predetermined by the direction of the automatic running vehicle (101) turning to the original guiding position Poa, in this case, the direction of the deflection is leftward, the above described fixed-point-turn scanning commands S command right turn, and are applied to the motor (102L), (102R) through the motor driving portion (107L), (107R), whereby the automatic running vehicle (101) starts to turn rightward at a fixed point. The fixed-point-turn is continued until the operation control portion (106) receives the peak detecting signal P from the peak detecting portion (111). The automatic running vehicle (101) turns until the vehicle assumes an attitude where the central axis of the same is perpendicular to the light reflector (108A) as shown by a solid line in FIG. 9, and the above described turn scanning command S from the operation control portion (106) disappears when the above described peak detecting signal P is outputted. On the occasion of the automatic running vehicle (101) turning excessively, the excessive turn correcting command $S_f$ is outputted from the operation control portion (106), so that the automatic running vehicle (101) turns at a fixed point in the reverse direction to the above described fixed-point-turn direction by the amount of the excessive turn, and assumes the attitude wherein the central axis X of the running vehicle is perpendicular to the reflecting face of the light reflector (108A).

The embodiment shown in FIGS. 6–7 may be combined with the embodiment of FIGS. 1–5 to provide a combined operation wherein the vehicle is accurately stopped and wherein fixed point turns may be accurately performed.

Figure 11:
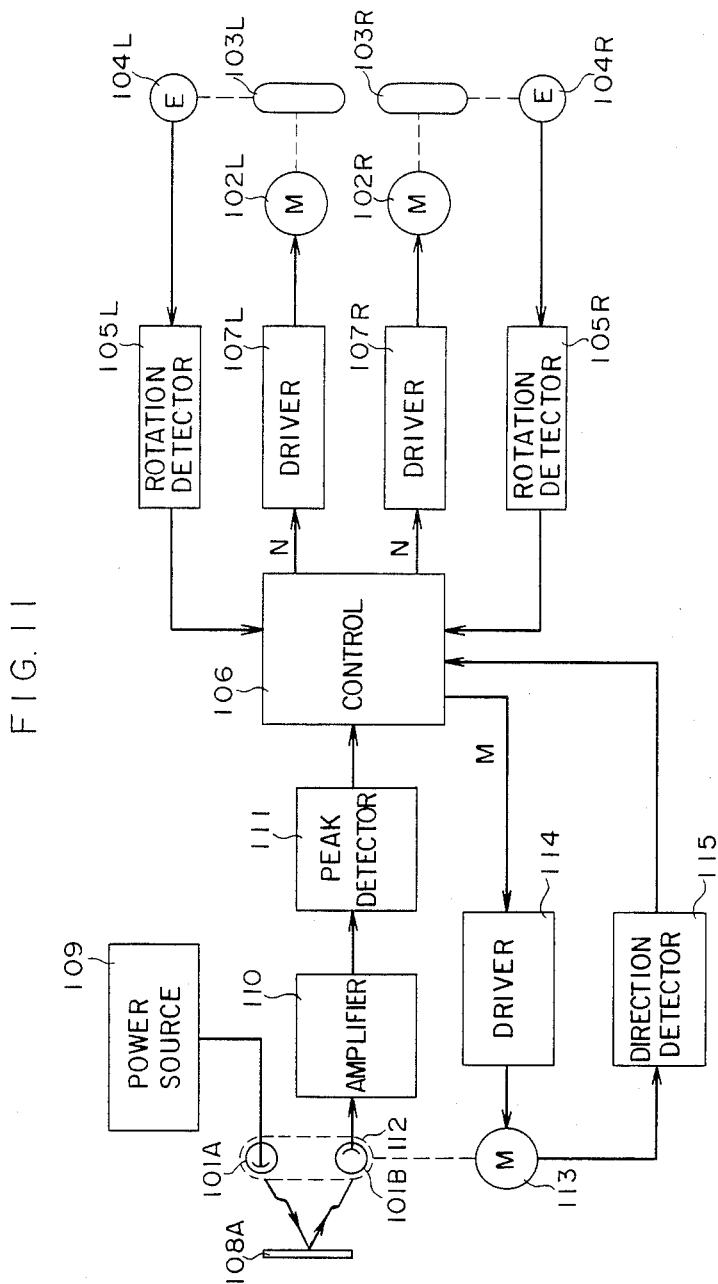
FIG. 11 is a block diagram of another embodiment of the present invention.
Figure 12:
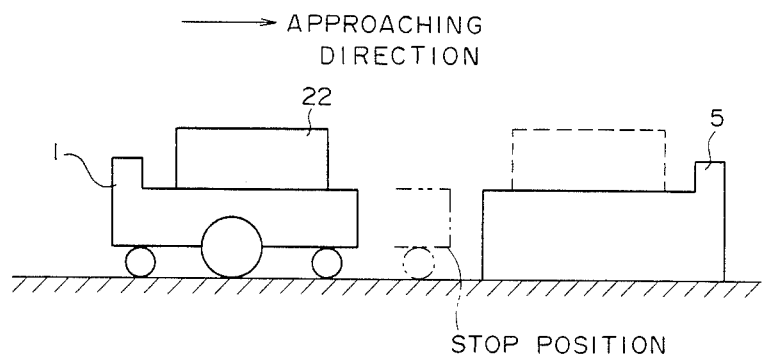
FIG. 12 is a schematically illustrative side view showing an example of the prior art.
Figure 13:
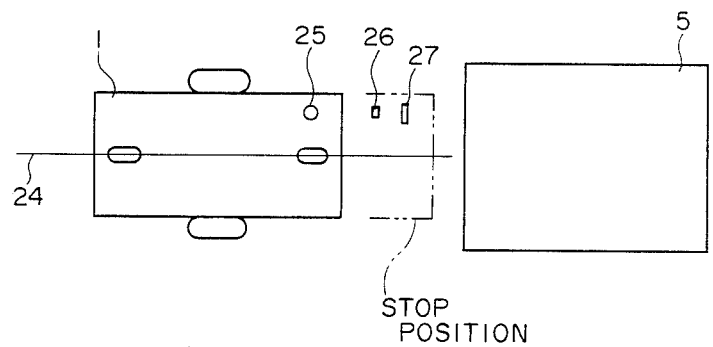
FIG. 13 is a schematically illustrative plan view corresponding to FIG. 12.

FIG. 11 shows another embodiment of the present invention, which may be used for fixed point turning of a vehicle, which may also be combined with the structure of FIGS. 6–7. In this embodiment where the light emitting element (101A) and the light receiving element (101B) are attached to the same panel, for example, to constitute a scanning portion (112), the scanning portion being rotatably provided on the automatic running vehicle (101) to be driven to rotate by a scanning motor (113). A rotate scanning command M is applied to this motor (113) through a scanning motor driving portion (114) from the operation control portion (106). The command has as its contents a predetermined rotating direction corresponding to the above described original guiding position. (115) denotes a direction detecting portion for detecting, on the basis of the number of rotations of the motor 113, the rotated angle $\theta$ of the scanning portion (112) with respect to the central axis X of the running vehicle, and the same inputs the detected rotated angle $\theta$ to the operation control portion (106). The rotated angle $\theta$ represents an angle formed by the running vehicle central axis X of the automatic running vehicle (101) and the light reflector central axis Y. The operation control portion 106 calculates, responsive to the rotated angle $\theta$ inputted thereto, the amounts of rotation of the drive wheels (103L), (103R) necessary to turn the automatic running vehicle (101) at a fixed point by the above described rotated angle $\theta$. The control portion 106 provides the amounts of rotation of the drive wheels (103L), (103R) calculated thereby and fixed-point-turning commands N, which have as the contents thereof the detections of rotation of the same for motors (102L), (102R), through the driving portions (107L), (107R). The above described turn scanning command M terminates when the peak detecting signal P is transmitted from the peak detecting portion (111).

In this embodiment, when the automatic running vehicle (101) stops at the original guiding position, the turn scanning command M is outputted from the operation control portion (106) and the scanning portion (112) starts to rotate and continues the rotating movement until the peak detecting signal P is outputted. When the peak detecting signal P is outputted, the fixed-point-turning commands N are outputted from the operation control portion (106) and the automatic running vehicle (101) turns at a fixed point in the direction of the rotation of the scanning portion (112) and stops after turning until the running vehicle central axis X is perpendicular to the reflecting face of the light reflector (108A).

Meanwhile, in each of the above described embodiments, if a microcomputer or the like is employed as the operation control portion (106), detection of a peak by the peak detecting portion (111) can be managed by means of software, or is a pulse motor is employed as the motor (113) for driving the scanning portion (112), the direction of the scanning portion (112) can be detected by counting the number of pulses for driving the same, so that the direction detecting portion (115) and the peak detecting portion (111) are not needed. In addition, the light emitting element (101A) and the light receiving element (101B) may be disposed on the axles of the wheels.

Figure 14:
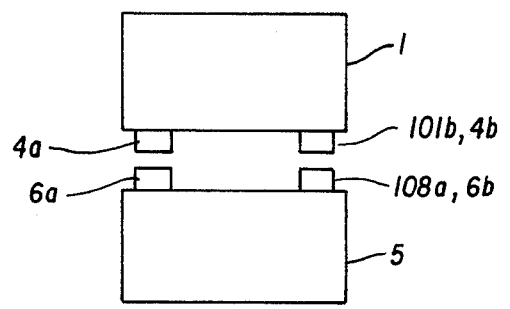
FIG. 14 is a schematic plan showing an embodiment of the invention which combines the features of FIG. 1 with the features of FIGS. 6, 7 and 11.

FIG. 14 illustrates that one of the light receiver units of the FIG. 1 embodiment may be a light receiver unit as depicted in FIGS. 6, 7 and 11.

According to the present invention, as described above, the attitude of an automatic running vehicle is controlled with respect to a reflector attached to a target object. There is no necessity to provide a guiding member or the like under the running floor or on the floor. This provides flexibility in managing the change of the placed position of the target object or the change of the running path.

What is claimed is:

1. A running control apparatus for a moving vehicle, comprising a pair of photoelectric sensors on the vehicle, each sensor including a light emitting element and a light receiving element, a pair of reflectors at a predetermined target position opposing said photoelectric sensors, first means for stopping the moving vehicle when the light receiving elements of said pair of sensors each substantially simultaneously receives light reflected by a corresponding one of said reflectors of the target, and means for fixed point turning said moving vehicle near said target position until said moving vehicle assumes an attitude whereat at least one of said sensors receives a maximum amount of light reflected from said reflectors.

2. A running control apparatus for a moving vehicle in accordance with claim 1, wherein the pair of photoelectric sensors are mounted to a side face of the moving vehicle.

3. A running control apparatus for a moving vehicle in accordance with claim 1, wherein a pair of photoelectric sensors are mounted to each of a pair of opposing side faces of the moving vehicle.

4. A running control apparatus for a moving vehicle in accordance with claim 1, including second means for shifting said moving vehicle to a deceleration mode based on reception by only one of the pair of photoelectric sensors of light reflected by only one of the reflectors of the target, the moving vehicle being thereafter stopped by the first means when the light receiving elements of said pair of sensors each substantially simultaneously receives light reflected by a corresponding one of said reflectors of the target.

5. A running control apparatus for a moving vehicle in accordance with claim 1, wherein a light emitting element and a light receiving element forming one of said sensors are rotatably mounted on said vehicle, and said fixed point turning means includes means for fixed-point-turning the vehicle, after rotating said light emitting element and light receiving element up to a direction in which said light receiving element receives a maximum amount of light from the light reflectors, until a central axis of said vehicle corresponds with said direction.

6. A running control apparatus for a moving vehicle in accordance with claim 5 further comprising
rotation detecting means connected for detecting an amount of rotation of wheels moving said vehicle and for producing wheel rotation signals representative thereof.

7. A running control apparatus for a moving vehicle in accordance with claim 6 wherein said means for fixed point turning said moving object further comprises
control means responsive to said wheel rotation signals for determining an amount of rotaion of said vehicle and for producing an output signal representative of the rotation of said vehicle.

8. A running control apparatus for a moving vehicle in accordance with claim 7 wherein said control means comprises means for determining whether further rotation of said vehicle is necessary in order to assume said attitude wherein said central axis of said vehicle corresponds to said direction, and for terminating rotation of said vehicle when peak signals from said reflectors are received by said photoelectric sensors.

9. A running control apparatus for a moving vehicle in accordance with claim 8 wherein said means for determining comprises means for detecting excessive turning of said vehicle with respect to said direction and for generating correction signals to correct said excessive turning.

10. A running control apparatus for a moving vehicle in accordance with claim 8 wherein said means for determining comprises
means connected for receiving an output from said photoelectric sensors,
means connected for receiving said output signals representative of rotation of said vehicle from said control means responsive to said wheel rotation signals and for generating control signals to activate driving means for the wheels moving said vehicle in order to attain said direction.

11. A running control apparatus for a moving vehicle in accordance with claim 1 further comprising rotation detecting means connected for detecting an amount of rotation of wheels moving said vehicle and for producing wheel rotation signals representative thereof.

12. A running control apparatus for a moving vehicle in accordance with claim 11 wherein said means for fixed point turning said moving object further comprises control means responsive to said wheel rotation signals for determining an amount of rotation of said vehicle and for producing an output signal representative of the rotation of said vehicle.

13. A running control apparatus for a self-propelled vehicle, comprising:

photoelectric means including scanning means rotatably mounted on said vehicle, rotating means for rotating said scanning means, said photoelectric means including a pair of light receiving means, a pair of reflectors at predetermined target positions opposing said light receiving means, first means for stopping the vehicle when the light receiving means of said photoelectric means each substantially simultaneously receives light reflected by corresponding ones of said reflectors, means for fixed point turning said vehicle, first rotation detecting means connected for detecting an amount of rotation of wheels moving said vehicle and for producing wheel rotation signals representative thereof, said fixed point turning means comprising control means responsive to said wheel rotation signals for determining an amount of rotation of said vehicle and for producing a vehicle rotation signal representative of the rotation of said vehicle, means for activating said rotating means for said scanning means to rotate said scanning means until a predetermined signal is received from said light receiving means and for generating a scanning means rotation signal, and means responsive to said scanning means rotation signal to generate a control signal for activating driving means for the wheels moving said vehicle to rotate said vehicle in accordance with said scanning means rotation signal.

* * * * *